US012744975B2

(12) United States Patent
Agarwal et al.

(10) Patent No.: US 12,744,975 B2
(45) Date of Patent: Sep. 22, 2026

(54) ENHANCED STREAMING MEDIA INTERSTITIALS WITH DYNAMIC RENDERING SUPPORT

(71) Applicant: YAHOO ASSETS LLC, Dulles, VA (US)

(72) Inventors: Amit Agarwal, Mountain House, CA (US); Thomas Van Chung Ng, San Francisco, CA (US); Herry Leonard, Fremont, CA (US); Sreekanth Mamidala, Mountain House, CA (US)

(73) Assignee: YAHOO ASSETS LLC, New York, NY (US)

( * ) Notice: Subject to any disclaimer, the term of this patent is extended or adjusted under 35 U.S.C. 154(b) by 0 days.

(21) Appl. No.: 17/900,164

(22) Filed: Aug. 31, 2022

(65) Prior Publication Data

US 2024/0073494 A1 Feb. 29, 2024

(51) Int. Cl.
*H04N 21/858* (2011.01)
*H04N 21/234* (2011.01)
*H04N 21/845* (2011.01)

(52) U.S. Cl.
CPC ....... *H04N 21/8586* (2013.01); *H04N 21/234* (2013.01); *H04N 21/8456* (2013.01)

(58) Field of Classification Search
CPC ......... H04N 21/23424; H04N 21/8586; H04N 21/234; H04N 21/8456
See application file for complete search history.

(56) References Cited

U.S. PATENT DOCUMENTS

| | | | | |
|---|---|---|---|---|
| 11,202,122 | B1 * | 12/2021 | Sehgal | H04N 21/44004 |
| 11,659,259 | B1 * | 5/2023 | Pressnell | H04N 21/23424 725/32 |
| 2013/0031478 | A1 * | 1/2013 | Strober | G06F 16/74 715/716 |
| 2015/0163545 | A1 * | 6/2015 | Freed | H04N 21/8456 725/19 |
| 2022/0182706 | A1 * | 6/2022 | Calderon | H04N 21/4312 |
| 2024/0056627 | A1 * | 2/2024 | Riedl | H04N 19/40 |

FOREIGN PATENT DOCUMENTS

| | | | |
|---|---|---|---|
| WO | WO-02086852 A1 * | 10/2002 | H04N 7/106 |

* cited by examiner

*Primary Examiner* — Yassin Alata
(74) *Attorney, Agent, or Firm* — James J. DeCarlo; Greenberg Traurig, LLP

(57) ABSTRACT

In some aspects, the techniques described herein relate to a method including: detecting, by a processor, an interstitial break during playback of a primary media asset; identifying, by the processor, an interstitial associated with the interstitial break, the interstitial associated with a type; instantiating, by the processor, a renderer based on the type of the interstitial; and executing, by the processor, the interstitial using the renderer.

20 Claims, 6 Drawing Sheets

ENHANCED STREAMING MEDIA INTERSTITIALS WITH DYNAMIC RENDERING SUPPORT

BACKGROUND

Hypertext Transfer Protocol Live Streaming (HLS) is a protocol to deliver on-demand and live streaming. HLS is supported by media players, web browsers, mobile devices, streaming servers, and other devices. Using HLS, content publishers can augment video streams by inserting content segments at appropriate positions within a stream. Historically, inserting content into an HLS stream suffered from degraded experiences or higher startup latency. HLS interstitials were intended to make it easier for publishers to serve video by injecting the secondary content within primary content. The playlist metadata schema was extended to insert such interstitial content and a new set of application programming interfaces were added for media players to discover, read, and process the interstitials. However, the current state of the art for interstitial insertion requires the use of (potentially transcoded) secondary HLS streams (i.e., HLS media streams) and does not support other alternative interstitial formats.

DETAILED DESCRIPTION

Figure 1:
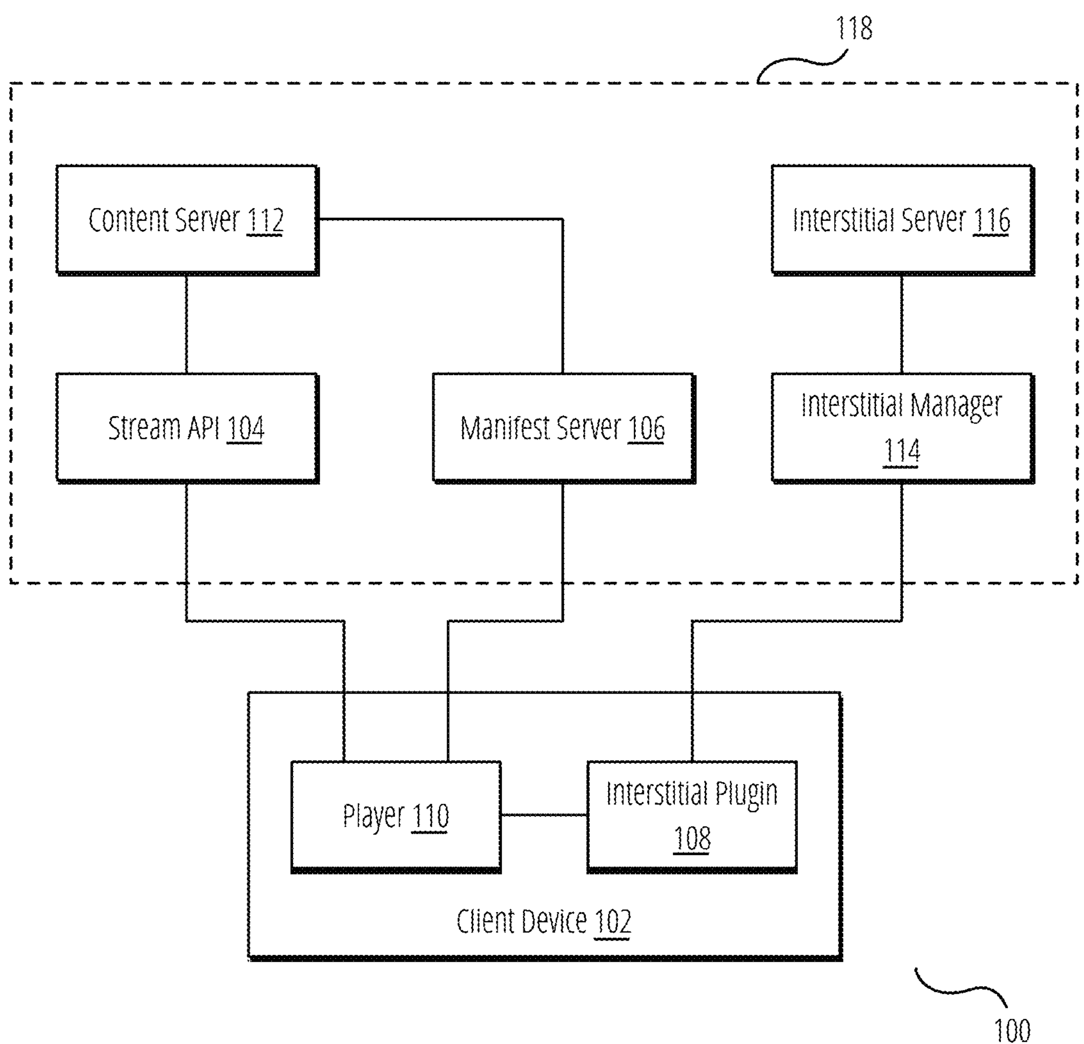
FIG. 1 is a block diagram of a system for providing enhanced interstitials.

The example embodiments provide techniques for supporting multiple interstitial types in a streaming media system such as HLS. The example embodiments utilize a plugin architecture wherein a plugin dynamically selects an appropriate render for multiple types of interstitials upon detecting an interstitial break. Once the interstitials are rendered by the plugin and the corresponding renderers, the plugin returns control to the primary media player for resuming playback of the primary media asset.

In some aspects, the techniques described herein relate to a method including: detecting, by a processor, an interstitial break during playback of a primary media asset; identifying, by the processor, an interstitial associated with the interstitial break, the interstitial associated with a type; instantiating, by the processor, a renderer based on the type of the interstitial; and executing, by the processor, the interstitial using the renderer.

In some aspects, the techniques described herein relate to a method, further including parsing a manifest associated with the primary media asset to identify the interstitial break.

In some aspects, the techniques described herein relate to a method, wherein parsing a manifest to identify the interstitial break includes parsing an M3U8 manifest to identify an EXT-X-DATERANGE element, the EXT-X-DATERANGE element having a CLASS attribute set to a preconfigured value.

In some aspects, the techniques described herein relate to a method, further including resolving the interstitial break by: receiving, by the processor, a uniform resource locator (URL) associated with the interstitial; transmitting, by the processor, a network request using the URL and receiving an interstitial payload in response; and storing, by the processor, the interstitial payload in a cache.

In some aspects, the techniques described herein relate to a method, wherein executing the interstitial includes playing an interstitial media asset.

In some aspects, the techniques described herein relate to a method, wherein executing the interstitial further includes one or more of handling interactions with the interstitial or tracking events occurring while playing the interstitial.

In some aspects, the techniques described herein relate to a method, wherein the primary media asset includes an Hypertext Transfer Protocol Live Streaming (HLS) asset and the type of the interstitial includes one of a Video Ad Serving Template (VAST), Video Player-Ad Interface Definition (VPAID), JavaScript Object Notation (JSON), or eXtensible Markup Language (XML) interstitial.

In some aspects, the techniques described herein relate to a non-transitory computer-readable storage medium for tangibly storing computer program instructions capable of being executed by a computer processor, the computer program instructions defining steps of: detecting an interstitial break during playback of a primary media asset; identifying an interstitial associated with the interstitial break, the interstitial associated with a type; instantiating a renderer based on the type of the interstitial; and executing the interstitial using the renderer.

In some aspects, the techniques described herein relate to a non-transitory computer-readable storage medium, the steps further including parsing a manifest associated with the primary media asset to identify the interstitial break.

In some aspects, the techniques described herein relate to a non-transitory computer-readable storage medium, wherein parsing a manifest to identify the interstitial break includes parsing an M3U8 manifest to identify an EXT-X-DATERANGE element, the EXT-X-DATERANGE element having a CLASS attribute set to a preconfigured value.

In some aspects, the techniques described herein relate to a non-transitory computer-readable storage medium, the steps further including resolving the interstitial break by: receiving a uniform resource locator (URL) associated with the interstitial; transmitting a network request using the URL and receiving an interstitial payload in response; and storing the interstitial payload in a cache.

In some aspects, the techniques described herein relate to a non-transitory computer-readable storage medium, wherein executing the interstitial includes playing an interstitial media asset.

In some aspects, the techniques described herein relate to a non-transitory computer-readable storage medium, wherein executing the interstitial further includes one or more of handling interactions with the interstitial or tracking events occurring while playing the interstitial.

In some aspects, the techniques described herein relate to a non-transitory computer-readable storage medium, wherein the primary media asset includes an Hypertext Transfer Protocol Live Streaming (HLS) asset and the type of the interstitial includes one of a Video Ad Serving Template (VAST), Video Player-Ad Interface Definition (VPAID), JavaScript Object Notation (JSON), or eXtensible Markup Language (XML) interstitial.

In some aspects, the techniques described herein relate to a device including: a processor; and a storage medium for tangibly storing thereon logic for execution by the processor, the logic including instructions for: detecting an interstitial break during playback of a primary media asset; identifying an interstitial associated with the interstitial break, the interstitial associated with a type; instantiating a renderer based on the type of the interstitial; and executing the interstitial using the renderer.

In some aspects, the techniques described herein relate to a device, the instructions further including parsing a manifest associated with the primary media asset to identify the interstitial break.

In some aspects, the techniques described herein relate to a device, wherein parsing a manifest to identify the interstitial break includes parsing an M3U8 manifest to identify an EXT-X-DATERANGE element, the EXT-X-DATERANGE element having a CLASS attribute set to a preconfigured value.

In some aspects, the techniques described herein relate to a device, the instructions further including resolving the interstitial break by: receiving a uniform resource locator (URL) associated with the interstitial; transmitting a network request using the URL and receiving an interstitial payload in response; and storing the interstitial payload in a cache.

In some aspects, the techniques described herein relate to a device, wherein executing the interstitial includes playing an interstitial media asset.

In some aspects, the techniques described herein relate to a device, wherein executing the interstitial further includes one or more of handling interactions with the interstitial or tracking events occurring while playing the interstitial.

FIG. 1 is a block diagram of a system for providing enhanced interstitials.

System 100 includes a client device 102 and a server-side platform 118. In some implementations, client device 102 can comprise a general-purpose computing device such as that depicted in FIG. 6. Further, server-side platform 118 can comprise one or more computing devices (such as that in FIG. 6) implementing some of all of the sub-components depicted. In general, client device 102 and server-side platform 118 may communicate over a network (e.g., the Internet) using various protocols including, but not limited to, Hypertext Transfer Protocol (HTTP), secure HTTP (HTTPS), HLS, or similar protocols. While the following description focuses on HLS, similar techniques can be applied to other streaming media protocols and the disclosure should not be limited as such.

Client device 102 can include various software components or libraries executing to stream media (e.g., video, audio, etc.) to a display. In one implementation, client device 102 includes a media player 110 and an interstitial plugin 108.

In an implementation, client device 102 can instantiate interstitial plugin 108 for each stream. In some implementations, the interstitial plugin 108 can be reused across streams. For example, in iOS® by Apple, Inc. of Cupertino, Calif., the media player 110 may be an AVPlayer instance while the interstitial plugin 108 may be an AVQueuePlayer instance. Specific APIs of these instances are not included in detail herein and reference is made to standard documentation for a complete reference of such functionalities.

Figure 2:
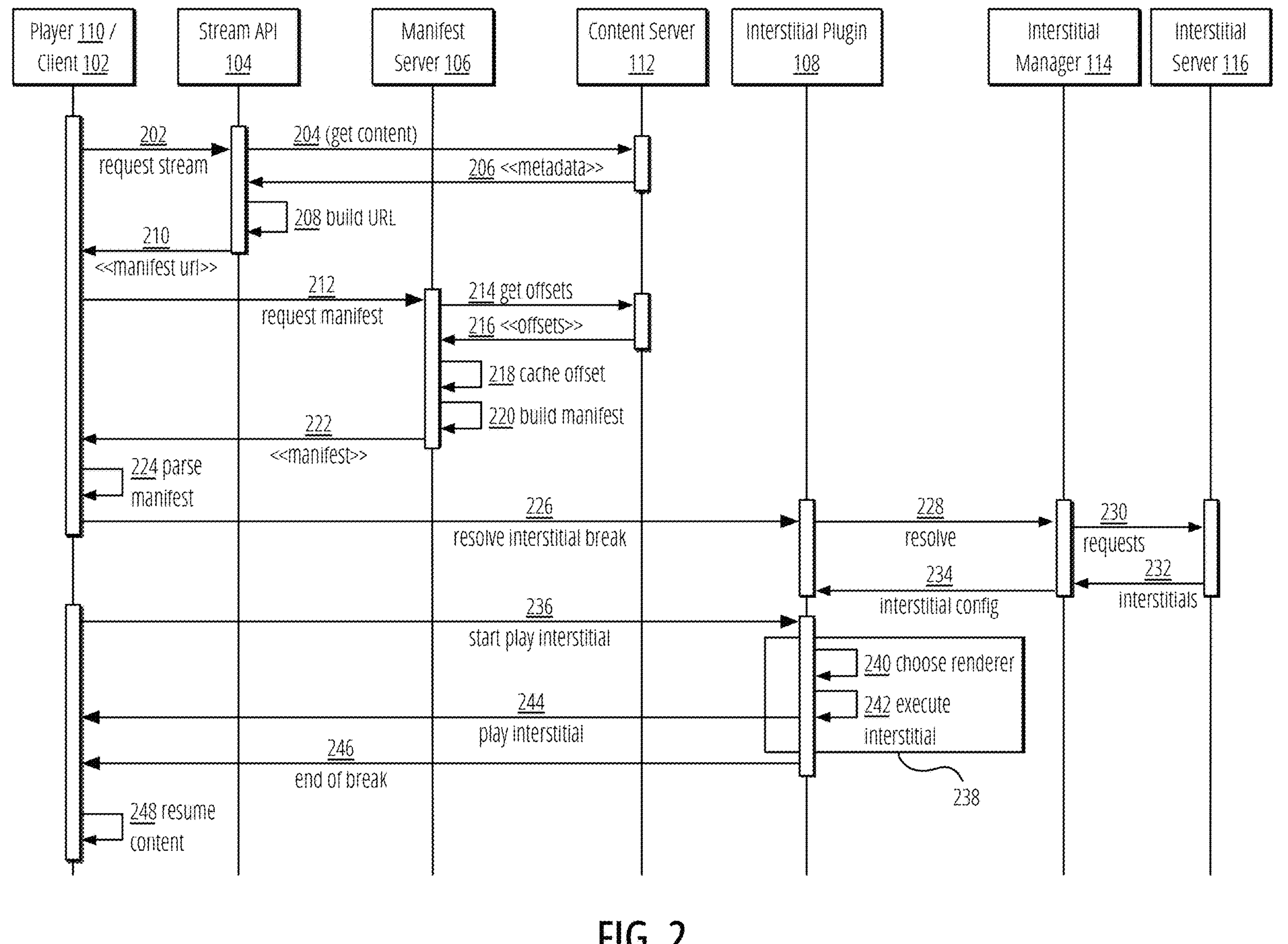
FIG. 2 is an interaction diagram of a system for providing enhanced interstitials.
Figure 4:
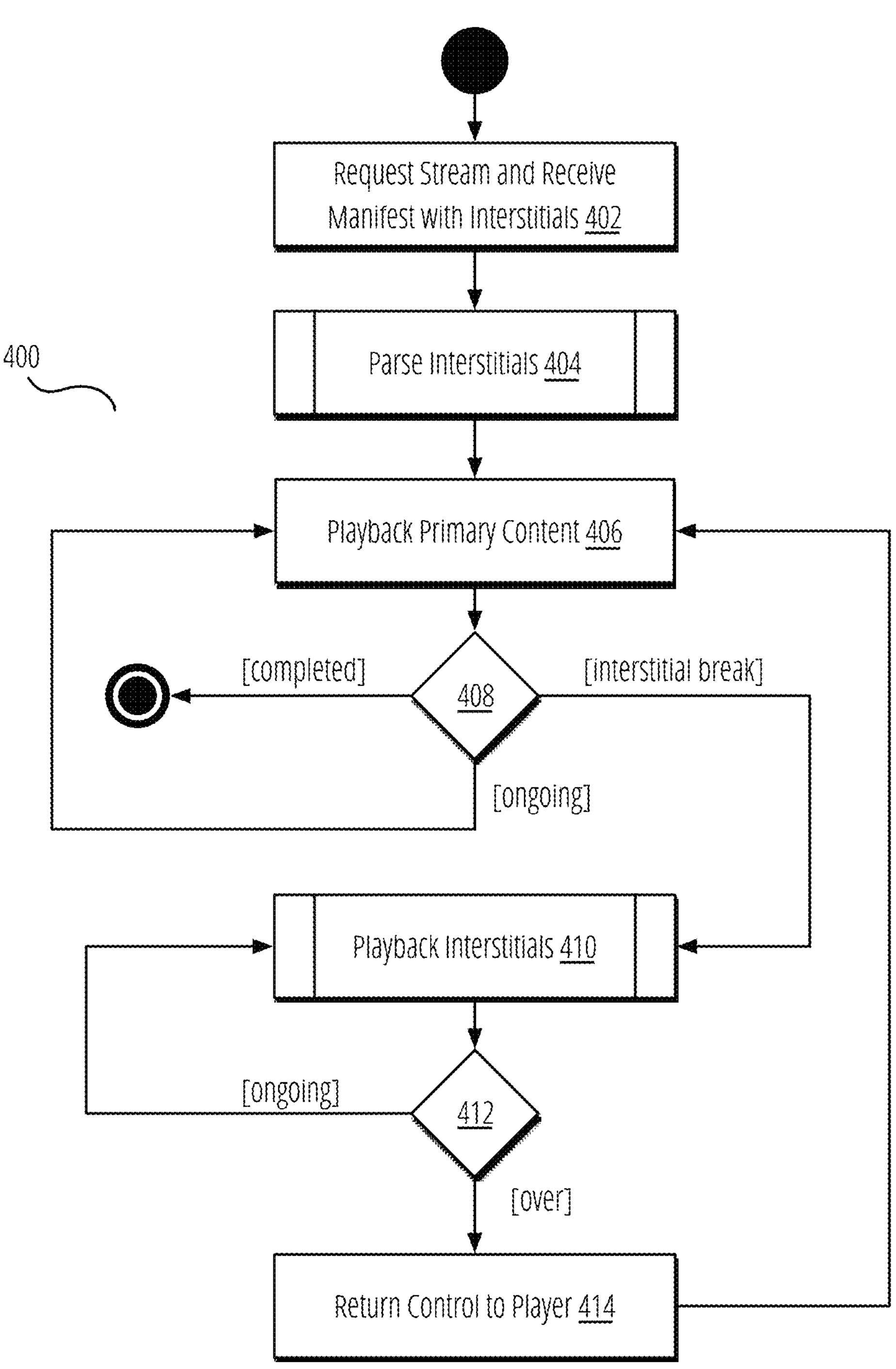
FIG. 4 is a flow diagram illustrating a method for playing back a video stream with embedded interstitials.

Details of the functions of media player 110 are described more fully in FIGS. 2 and 4 and are not repeated herein. Details of the functions of interstitial plugin 108 are described more fully in FIGS. 2 and 5 and are not repeated herein.

In brief, the media player 110 negotiates with server-side platform 118 to obtain a stream manifest and loads primary content for rendering on a display of client device 102. At defined points, media player 110 hands over control of rendering to interstitial plugin 108 which loads an interstitial and an appropriate renderer. Interstitial plugin 108 then renders the interstitials until ceding control back to media player 110 to continue playing the primary content. In some implementations, the media player 110 and the interstitial plugin 108 may be implemented as browser-based libraries for streaming media via a web browser. In other implementations, media player 110 and interstitial plugin 108 can be implemented as mobile application libraries for playing back streaming media and interstitials in a mobile application. In yet other implementations, one or both of media player 110 and interstitial plugin 108 can be implemented as a standalone application for streaming media and interstitials.

In an implementation, server-side platform 118 includes a stream application programming interface, stream API 104, a content server 112, a manifest server 106, an interstitial manager 114, and an interstitial server 116. Specific operations by these components are provided in FIG. 2 and not described in detail herein.

Stream API 104 can comprise a front-end application server that can receive requests for a media stream (e.g., via HTTPS) and return a uniform resource locator (URL) of a manifest file (e.g., an M3U8 playlist) to a requesting client (e.g., client device 102). Stream API 104 can authenticate users and perform other authorization checks before returning a manifest. Stream API 104 can transmit requests to the content server 112 for content associated with a stream. The content server 112 may store transcoded primary media content for streaming. The stream API 104 can provide the manifest URL to the client for accessing an HLS stream. The client device 102 can then issue a network request (e.g., HTTP request) to the manifest server 106 (via the received URL) to receive a manifest. In response, the manifest server 106 can request a series of offsets for the streaming media from the content server 112. As discussed, the content server 112 stores primary media content and, in some implementations, can store this content as a series of segments. In response to a request from manifest server 106, the content server 112 can return metadata describing the offsets (e.g., as an ordered sequence of offsets) which can be inserted into an M3U8 playlist (i.e., manifest). In some implementations, manifest server 106 may optionally determine if the client device 102 supports mid-roll interstitials. As used herein, a mid-roll interstitial refers to secondary content inserted during the playback of a media file but not before or after the media file starts and ends, respectively. Media content inserted before or after a media file is referred to as bumper content or bumper interstitials. Ultimately, the manifest server 106 returns the manifest (i.e., M3U8 playlist or equivalent) to the client device 102.

In response, the client device 102 parses the manifest and begins playback of the media content by issuing network requests to the content server 112 for the content segments corresponding to the offsets in the manifest. At any point during playback (frequently in the beginning), the client device 102 may issue a network request to the interstitial manager 114 to resolve any interstitials identified in the manifest. In response, the interstitial manager 114 queries the interstitial server 116 to obtain data about the interstitials (e.g., the interstitial content itself, URLs of the interstitial content, etc.). The interstitial manager 114 provides configuration data regarding the interstitials to the client device 102 (via the interstitial plugin 108) for use when needed. In some implementations, the interstitial manager 114 can return an eXtensible Markup Language (XML) response, such as a Video Ad Serving Template (VAST) response, including data describing the interstitials. Alternatively, or in conjunction with the foregoing, other formats can be returned such as a JavaScript Object Notation (JSON) format. Any such format includes data regarding the interstitials including, but not limited to, media to play during the interstitial, tracking code, click or impression event handlers, etc.

As discussed above, when the client device 102 detects that an interstitial should be played back, the media player 110 hands over control to the interstitial plugin 108 for playing back the interstitial. Details on the foregoing processes are described more fully in the following figures.

FIG. 2 is an interaction diagram of a system for providing enhanced interstitials.

In step 202, a client device 102 or media player 110 requests a stream. In some implementations, either a client device 102 or media player 110 can issue the requests and perform the operations in FIG. 2. As discussed previously, the stream can comprise a video stream (live or on-demand), audio stream, or any other type of media stream. In some implementations, step 202 includes issuing a network request (e.g., HTTPS request) from the client to the stream API to access a stream. In some implementations, step 202 can also include authenticating to the stream API to initiate a stream. In some implementations, the request in step 202 can include an identifier or other type of filter criteria to identify which stream is being requested.

In step 204, the stream API issues a request to the content server 112 to obtain metadata describing the stream. In some implementations, the metadata can include any type of parameters set by the content server 112 to enable the client to access the stream. For example, the parameters can include an identifier of the stream, session parameters (e.g., a session token), or similar types of parameters defining the stream and the client's use of the stream. Alternatively, or in conjunction with the foregoing, the metadata can include metadata describing the requested content. For example, the metadata can include a content length, category, etc. In some implementations, stream API 104 can request content from the content server 112 by issuing a network (e.g., HTTPS) request. In other implementations, if the content server 112 and stream API 104 are implemented on the same device, step 204 can be implemented as an inter-process communication (IPC) call or similar type of call. In step 206, content server 112 returns the metadata to the stream API 104 for use in building a manifest URL.

In step 208, stream API 104 builds a manifest URL based on the returned metadata. In some implementations, stream API 104 can use a URL template and populate the URL template with the returned metadata. For example, the template can include a protocol (e.g., HTTPS), domain of the manifest server 106, and stream endpoint (i.e., path on the manifest server 106). The stream API 104 can then insert the metadata into one or more query parameters of the template to populate the URL. In some implementations, stream API 104 can optionally determine if mid-roll interstitials should be enabled. In one implementation, stream API 104 can make this determination based on properties of the media player 110 received as part of the request in step 202. For example, stream API 104 can determine if the type of media player 110 supports inserting interstitials mid-playback (or only as bumper interstitials at the beginning and/or end). If so, stream API 104 can update the manifest URL to indicate as such. Alternatively, or in conjunction with the foregoing, stream API 104 can make the determination of whether mid-roll interstitials are enabled based on one or more of the stream contents itself, the publisher, or an explicit flag set by the content server 112 and returned as part of the metadata in step 206. As will be described, when building the manifest, the use of a mid-roll enabled flag can aid the manifest server 106 in determining where to place interstitial breaks in a stream. After building the manifest URL, the stream API 104 returns the manifest URL to the media player 110 in step 210. For example, the stream API 104 can return the manifest URL as a response to the HTTPS request issued in step 202. As another example, the stream API 104 can redirect the media player 110 to the manifest URL (e.g., via an HTTP 302 status code with a Location header value set to the manifest URL).

In step 212, the client device 102 issues a request for a manifest to the manifest server 106. As discussed above, the client device 102 can issue the request in step 212 by accessing the manifest URL returned in step 210. In some implementations, step 212 is explicit (i.e., the client device 102 affirmatively generates a new HTTPS request) while in other implementations the request can be the result of a redirect (e.g., HTTP 302).

In step 214, the manifest server 106 issues a request (e.g., network or IPC) to the content server 112 to obtain interstitial offsets for a given stream and receives the offset data in step 216. In optional step 218, the manifest server 106 can cache the offsets in a local storage device thus bypassing step 214 and 216 for future manifest URL requests for the same stream.

The manifest server 106 may extract a stream identifier or similar type of identifying data to provide to content server 112 to allow the content server 112 to identify the segments corresponding to a given stream and then identify where (or when) offsets should be set for a given stream. In some implementations, the offsets can include multiple offsets at different times relative to a fixed length content item. In other implementations, the offsets can comprise relative offsets for a live stream (e.g., every fifteen minutes). In some implementations, the offsets can also include further data related to the interstitials. For example, any given offset can also include a URL for the interstitial (X-ASSET-URI) or a list of URLs (X-ASSET-LIST). Further details of such data are described next.

In step 220, the manifest server 106 can build a manifest for the given stream and, in step 222, can return the manifest file to the client device 102.

Some aspects of building a manifest are not described herein, such as known processes for building a standard stream manifest (e.g., the placement of #EXTINF marks for stream segments, etc.). However, unlike existing systems, step 220 includes inserting the offset markers based on the offset data returned in step 216. An example of an offset marker is provided below (in the context of an HLS manifest):

#EXT-X-DATERANGE:ID="ad1", CLASS="com.example.hls.interstitial", START-DATE="2020-01-0 2T21:55:44.000Z", DURATION=15.0, X-ASSET-URI="https://interstitial-server.example.com/ssai/int", X-RESUME-OFFSET=0, X-RESTRICT="SKIP,JUMP"

A manifest can include one or more of the above markers. In the above example, "#EXT-X-DATERANGE" represents an HLS tag for scheduling an interstitial relative to a primary asset. As will be discussed, a player will pause playback of the primary asset and play the interstitial based on the contents of the tag. The tag includes an identifier ("ID") that uniquely identifies a date range tag in the manifest.

The tag includes a custom class attribute ("cLAss") that allows a player to appropriately handle the interstitial. In an implementation, the class attribute is set to a preconfigured value ("com.example.hls.interstitial") that the media player 110 is capable of detecting to enable the media player 110 to appropriately handle the date range tag using the methods described herein. Generally, standard interstitials use a different class identifier ("com.apple.hls.interstitial") and thus the use of a custom class attribute allows for a media player 110 to handle both standard interstitials and the improved interstitials described herein.

The tag also includes a start date ("START-DATE") attribute that represents the date and time in which the interstitial begins and an optional duration attribute ("DURATION") that specifies the duration of the interstitial.

The tag can also include various custom attributes, denoted as beginning with "X-." Specifically, the tag can include a URI of the interstitial server ("X-ASSET-uRi"). Notably, the URI in the foregoing example is truncated for ease of reading and may include further location paths and parameters. In general, the URI will identify a specific asset managed by the interstitial manager 114 accessible via the URI. As discussed above, the tag can alternatively include a list of URIs ("X-ASSET-LIST"). The tag can also include an attribute ("X-RESUME-OFFSET") representing where the primary playback should resume following the playback of an interstitial. The tag can also include an attribute ("X-RESTRICT") identifying which actions should be prevented while the interstitial is played. Certainly, other attributes can be included as well. As will be discussed, these attributes (and notably the class attribute) allow a player to appropriately select a renderer during an HLS stream using the methods described further herein.

In step 224, the client device 102 or media player 110 parses the manifest to initiate playback of the primary asset. Specific details of parsing a manifest to playback a primary asset are not described herein and are generally known in the art. For example, the player 110 can utilize a JS-HLS renderer to playback the primary asset. However, step 224 also includes parsing the manifest to resolve interstitials, which is described in more detail herein. In some implementations, immediately after step 224, player 110 begins playing back the primary asset. In other scenarios (e.g., a beginning bumper), the player 110 can proceed to step 226 through step 248 first before playing the primary content.

Specifically, when parsing the manifest in step 224, client device 102 will detect the offset markers (e.g., "EXT-X-DATERANGE") for the interstitials. When processing the attributes of these marks, the client device 102 will detect the custom class element and process these markers using the following methods. Certainly, if a given offset marker includes another standard class identifier, traditional mechanisms can be used in parallel to process those markers normally. Further, in some implementations, client device 102 can simply presume all markers should be handled using the following methods and may not perform a check of the class attribute.

In step 226, the player 110 initializes the interstitial plugin 108 to resolve an interstitial break.

Figure 3:
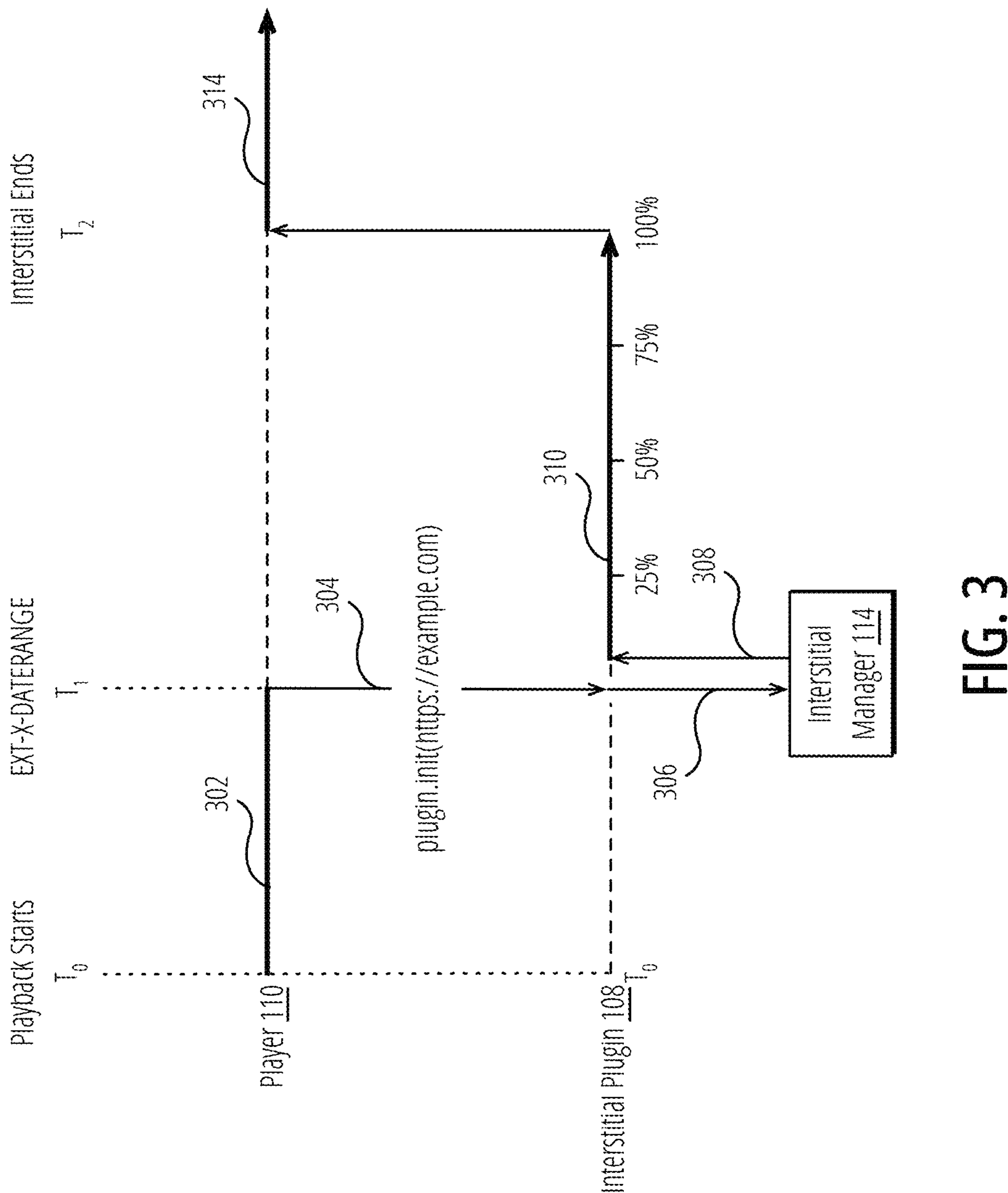
FIG. 3 is a timeline diagram illustrating an interstitial event.

FIG. 3 is a timeline diagram illustrating an interstitial event.

As illustrated, a media player 110 can initiate the playback of primary content (e.g., audio, video, etc.) at $t_0$ during a first period 302, the player renders the primary content at the client device.

As discussed above, at t 1 media player 110 pauses the primary content rendering and cedes control to interstitial plugin 108. More specifically, a manifest associated with the primary content includes a marker, tag, or other indicator (e.g., an "EXT-X-DATERANGE" marker in an HLS manifest) that includes data related to interstitial content. As one example, the marker can include a class attribute and an asset list or assert uniform resource indicator (URI). The marker can also include other attributes such as an identifier, a start date/time, an end date/time, an actual duration, a planned duration, as well as custom attributes. In the illustrated FIG. 3, the EXT-X-DATERANGE marker may include a URI of the interstitial manager. When transferring control in step 304, the media player 110 can provide this URI to the interstitial plugin 108. For example, the interstitial plugin 108 can be initialized with the URI.

After initialization, the interstitial plugin 108 transmits a request to the interstitial manager 114 in step 306 for an interstitial. In response, the interstitial plugin 108 receives the interstitial from the interstitial manager 114 in step 308. Further, the interstitial manager 114 analyzes the returned interstitial to determine a type of the interstitial. In some implementations, the type may be identified from a list of known types (e.g., JSON, XML, VAST, HTML5, JS-HLS, etc.). In response, the interstitial plugin 108 can select an appropriate renderer for handling the type of interstitial returned by the interstitial manager 114. Notably, the interstitial plugin 108 uses multiple available renderers to enable a richer support for different types of interstitials including types yet to be created. Thus the interstitial plugin 108 provides an extensible architecture for supporting non-HLS interstitial types within an HLS streaming system, a feature currently not supported by HLS streaming systems.

The interstitial plugin 108 then uses the chosen render to playback the interstitial during second period 310. As illustrated, the interstitial plugin 108 will playback the entire interstitial (or set of interstitials) until completion at time t 2. At this point, the interstitial plugin 108 will return control to the media player 110 such that the media player 110 can resume playing back the primary content in third period 314.

Returning to FIG. 2, in some implementations, step 226 can include the media player 110 providing the asset URI (or list of URIs) to the interstitial plugin 108 for initializing. In step 228, the interstitial plugin 108 issues a request to the interstitial manager 114 (via the asset URI or list of URIs) to receive configuration data of the interstitial(s). In response to a request from the interstitial plugin 108, the interstitial manager 114 accesses the interstitials stored on interstitial server 116 in step 230. The interstitial server 116 returns the interstitials in step 232 and the interstitial manager 114 can generate an interstitial response packet for transmission to the interstitial plugin 108. The interstitial response packet can be a JSON, VAST, Video Player-Ad Interface Definition (VPAID), or other type of standard response packet. Finally, the interstitial manager 114 can transmit the interstitial response packet to the interstitial plugin 108. Specific details of generating an interstitial response packet are not described in explicit detail herein. Indeed, in many implementations, the generation of an interstitial response packet may use pre-existing interstitial formats (e.g., JSON, VAST, VPAID) and thus can be implemented separately from the interstitial plugin 108 and media player 110. At the conclusion of step 234, the interstitial plugin 108 includes all interstitial response packets for the currently rendering primary asset and thus is ready for processing interstitials upon the media player 110 detecting an interstitial break (as scheduled in the manifest).

In step 236, the player 110 detects an interstitial break. As discussed above, the player 110 may parse the manifest (step 224) and schedule interstitial breaks based on the offset markers for each interstitial. Thus, during playback of the primary content, player 110 can monitor the timing and perform step 236 when an interstitial break is reached. In step 236, player 110 transfers control of rendering to the interstitial plugin 108 and can provide the offset details (e.g., the specifically triggered offset) to the interstitial plugin 108.

In process 238, the interstitial plugin 108 can loop through all interstitials of a given offset and playback each interstitial in series. As illustrated, process 238 can include step 240 to select an appropriate renderer and then step 242 to execute the interstitial. Step 240 and step 242 can be executed for each interstitial of an offset (including a single interstitial) until all interstitials are executed.

In step 240, interstitial plugin 108 loads an interstitial configuration (received in step 234) and detects which type of renderer is needed. As discussed above, the interstitial configuration can take the form of a JSON, VAST, VPAID, or other type of payload. Indeed, no such limit is placed on the technology used to develop and deploy an interstitial. In step 240, the interstitial plugin 108 can analyze the type of interstitial and load the appropriate renderer. As such, the interstitial plugin 108 may include multiple renderers for handling different types of interstitial payloads. Next, in step 242, the interstitial plugin 108 can use the selected renderer to playback or execute the interstitial to facilitate playing back the media content in step 244. In some implementations, the interstitial may only include media assets and thus the renderer may simply playback the media content in step 244. However, other interstitials may include executable code or other non-media assets that can be used to provide interactivity to the client device 102. Thus, in addition to playing back media content in step 244, process 238 can also include executing this additional functionality.

Once interstitial plugin 108 has executed all interstitials for a given break, it cedes control to media player 110 in step 246, signaling the end of the interstitial break. In response, the media player 110 can resume playback of the primary content in step 248. Although a single break is illustrated, media player 110 can detect multiple such breaks during the playback of a stream and thus execute the foregoing steps for each break.

FIG. 4 is a flow diagram illustrating a method for playing back a video stream with embedded interstitials.

In step 402, method 400 can include requesting a stream and receiving a manifest with interstitials. As discussed above, a client device (itself or via a media player) may request a stream from a stream API via a network call (e.g., an HTTPS request). Ultimately, the client device receives a manifest that includes the segments of the stream (which method 400 can render or play as primary content in step 404) as well as interstitial data. As part of step 402, method 400 may parse the manifest to identify such segments and initiate playback of these segments. Further, however, the interstitial data can be captured in an element of the manifest, such as an #EXT-X-DATERANGE marker or tag within a M3U8-compliant playlist (e.g., as used by HLS). Various elements of the modified #EXT-X-DATERANGE element were described previous and not repeated herein.

Figure 5:
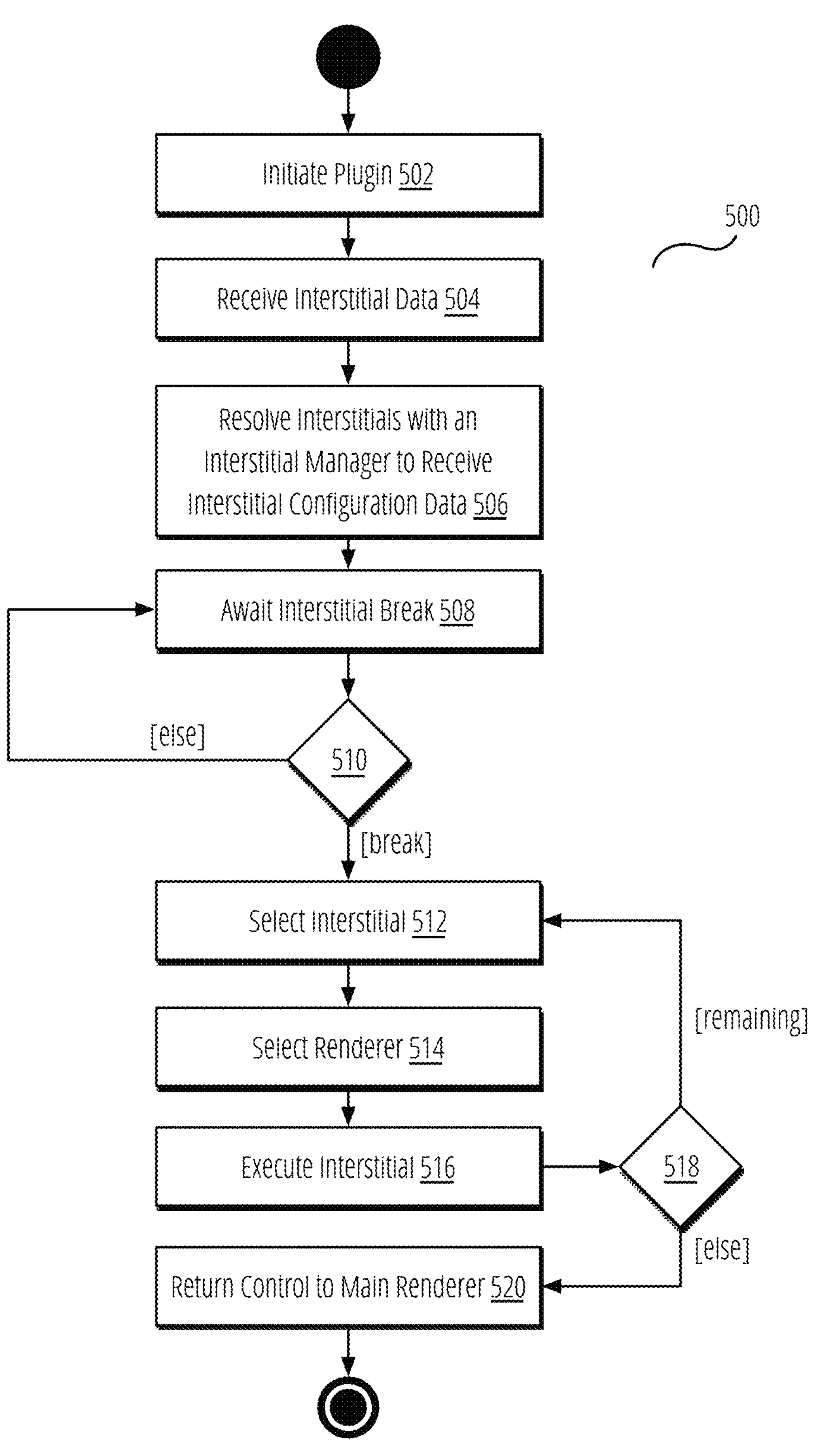
FIG. 5 is a flow diagram illustrating a method for processing interstitials.

In step 404, method 400 can include parsing the interstitial elements of the manifest using a dedicated plugin. In brief, method 400 transmits the interstitial data to a dedicated plugin which handles parsing the interstitial data. Details of the operations of this plugin are described in more detail in FIG. 5 and are not repeated herein. Reference is made to FIG. 5 and, in particular, step 502 through 506 for operations performed in step 404.

In step 406, method 400 can include playing back the primary content. Specific methods for playing back a media stream are not limiting and not described in detail herein. In brief, in one implementation (e.g., HLS), the player can begin processing segments and requesting the segment media files and playing back the segment media files in sequence to render a stream. In step 408, method 400 can include determine whether (a) playback should continue; (b) whether playback ended; or (c) whether an interstitial break occurred. As illustrated, step 406 and step 408 represent a continuous process whereby primary content is rendered until completed while intermittently interstitial breaks may occur during playback of the primary content.

As illustrated, in step 408, method 400 can detect an interstitial break while playing back primary content. When such an interstitial break is detected (or scheduled), method 400 can playback the interstitial(s) in step 410. In brief, a player executing method 400 provides details regarding the specific interstitial break to the plugin and cedes control of rendering to the plugin. Details of the operations of the plugin are described in more detail in FIG. 5 and are not repeated herein. Reference is made to FIG. 5 and, in particular, step 512 through 520 for operations performed in step 410.

In step 412, the media player awaits completion of execution of all interstitials in the interstitial break. While the interstitial execution is ongoing, method 400 pauses the playback of primary content. Ultimately, the plugin will signal to the media player that all interstitials were executed. As such, in step 414, the plugin returns playback control to the player which then continues to playback primary content in step 406. As illustrated, this process repeats continuously during the playback of primary content until the primary content playback ends (either by the stream ending or by the user prematurely ending the stream).

FIG. 5 is a flow diagram illustrating a method for processing interstitials.

In step 502, method 500 can include initiating a plugin.

As described above, in some implementations, a media player or other software can initiate the plugin in response to starting a stream. In one implementation, the plugin can be initiating by instantiating an AVQueuePlayer instance in iOS®.

In step 504, method 500 can include receiving interstitial data. In an implementation, method 500 can receive a set of interstitials to playback at a designated time. In some implementations, the interstitial data representing the set of interstitials can include one or more URLs or URIs of interstitials included in a manifest of a streaming media file.

In step 506, method 500 can include resolving the interstitial data with an interstitial manager to obtain interstitial configuration data.

As discussed previously, a manifest includes interstitial URL(s) representing a URL of the manifest server that can provide further interstitial data of the interstitials. In step 506, method 500 can include accessing the URL(s) to obtain more detailed data regarding the interstitials. In some implementations, the interstitial URL(s) can be augmented with additional data representing the client device or player. For example, the interstitial URL(s) can be augmented with an identification of the operating system, web browser, application, and any player-supported functionalities. Certainly, other types of operational parameters can be used to augment the interstitial URL(s). Further, in some embodiments, the additional data can include properties of a user account or similar types of demographic data that may be used to select interstitials.

As such, step 506 can include issuing a network request (e.g., HTTPS request) to the interstitial manager to obtain such interstitial data. The data returned by the interstitial manager to method 500 may comprise a payload of interstitial metadata or configuration that the plugin can use to execute interstitials. In some implementations, the data can be tailored to any additional data included in the interstitial URL(s). That is the interstitial manager can use the additional data to determine the type or form of interstitials to return. For example, if the additional data indicates that the player supports a specific type of interstitial, the interstitial manager can select a type of interstitial based on this explicit identification. As an example, the interstitial configuration can include a JSON, VAST, VPAID, or similar type of interstitial payload format that defines the characteristics of the interstitial (including the media file URLs, interactive capabilities, etc.).

After receiving the interstitial configuration data, method 500 can cache the interstitial configuration data and, in step 508, can await (step 510) an interstitial break in the primary content playback. As such, after step 506, a plugin is configured with a complete set of interstitial configuration data for all interstitials currently scheduled during primary content playback. Ultimately, as discussed in FIG. 4, a media player will detect an interstitial break and trigger playback of the corresponding interstitials. At this point, method 500 will proceed to step 512.

In step 512, method 500 has receive a notification from the primary media player that an interstitial event occurred. As discussed above, this notification may include a list of interstitials to play or may include offset details that method 500 can use to query which interstitials to play (based on the listing received in step 504). The list of interstitials can include one or more interstitials and as such, method 500 selects an interstitial from the list of one or more.

In step 514, method 500 can include selecting a renderer for the interstitial.

As discussed above, the plugin caches interstitial configuration data which can include a type of the interstitial (either explicitly or by identifying a payload structure returned from the interstitial manager). In step 514, method 500 identifies a type of the interstitial selected in step 512 and loads the corresponding renderer. As discussed, the plugin can be equipped with any number of renderers for specific interstitial types. As such, the plugin is extensible and can handle a wide range of interstitial types. This ensures that the widest possible range of interstitials can be supported by the underlying streaming protocol (e.g., HLS) and removes the limitation that only certain types (e.g., other HLS streams) of interstitials can be used.

As used herein, a renderer refers to a software component (either a standalone component or, more commonly, a separate rendering plugin) that can process a given interstitial. In most implementations, a renderer will include a playback component that can display or otherwise present the media content of the interstitial. For certain types of interstitials, the renderer may include other components for handling other aspects of the interstitial. For example, if the interstitial configuration data includes interactive content or portions, the renderer will include event handlers for processing interactions with the interstitial.

In step 516, method 500 can include executing the selected interstitial. In an implementation, method 500 can operate the renderer to playback the media content of the selected interstitial as well as process any other aspects of interstitial (e.g., interactive content). For example, step 516 can include rendering an HTML IFRAME or similar type of element to overlay the interstitial media content over the primary media content as well as provide one or more regions of interactivity within the IFRAME.

After execution of the interstitial completes, method 500 can include determining (step 518) if any more interstitials remain to be executed for the given interstitial break. If so, method 500 can repeat step 512 through step 516 for each remaining interstitial. As discussed, method 500 includes selecting an appropriate renderer for each interstitial and executing the interstitial using the appropriate renderer. Once all interstitials for a given interstitial break have been executed, method 500 proceeds to step 520 where a signal is transmitted to the main media player indicating that all interstitials have played. In response, the media player will resume playback of the primary media asset.

To illustrate the foregoing method, the following example is provided. In this example, a manifest may include one interstitial break with three interstitials provided to method 500 in step 504. The manifest may identify these three interstitials via three URLs (or a single URL). In response to a request (step 506), the interstitial manager may receive three payloads of interstitial configuration data (step 506) that includes an HLS payload and a VAST payload. When the interstitial break occurs, the plugin may select the HLS payload first and load an HLS renderer which simply plays back the interstitial media asset identified in the HLS payload. Once the HLS payload is executed, the plugin may select the VAST payload and instantiate a VAST render that plays back the interstitial media asset and transmits tracking beacon data to one or more tracking endpoints identified in a <TrackingEvents> element of the VAST payload. It may also render companion interstitials corresponding to each <Companion> element in the VAST payload. As can be seen, the foregoing method 400 and method 500 support multiple interstitial types, allowing for dynamic selection of renders during an HLS session.

Figure 6:
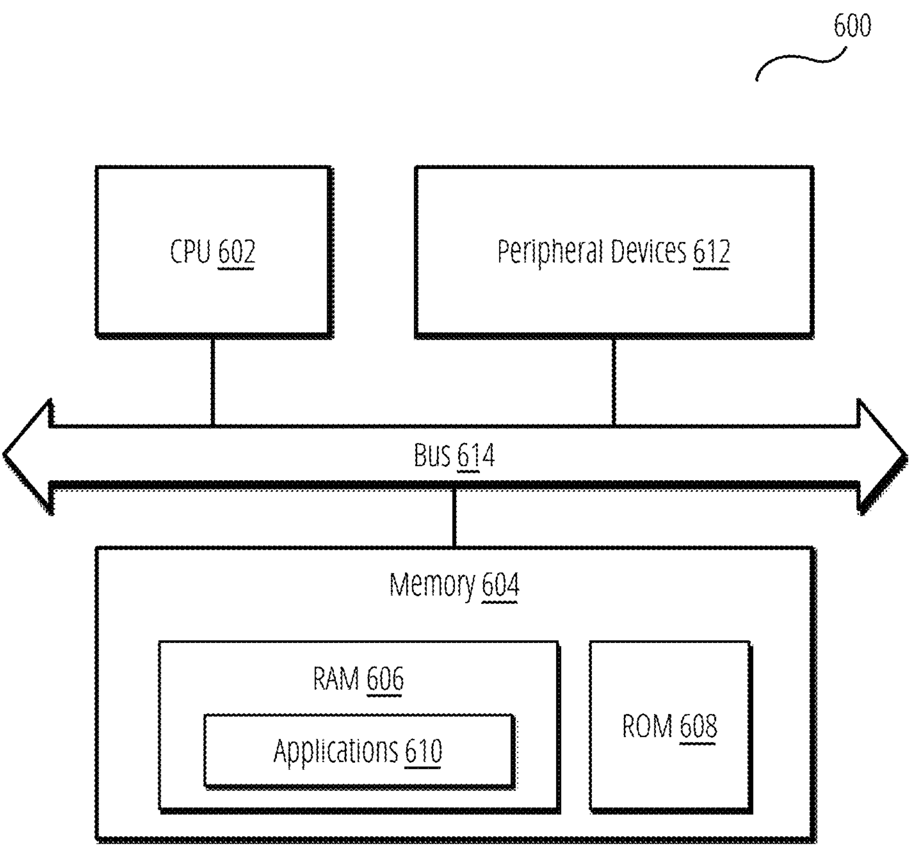
FIG. 6 is a block diagram of a computing device.

FIG. 6 is a block diagram of a computing device.

In some embodiments, the computing device 600 can be used to perform the methods described above or implement the components depicted in the foregoing figures.

As illustrated, the computing device 600 includes a processor or central processing unit (CPU) such as CPU 602 in communication with a memory 604 via a bus 614. The device also includes one or more input/output (I/O) or peripheral devices 612. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 602 may comprise a general-purpose CPU. The CPU 602 may comprise a single-core or multiple-core CPU. The CPU 602 may comprise a system-on-a-chip (SoC) or a similar embedded system. In some embodiments, a graphics processing unit (GPU) may be used in place of, or in combination with, a CPU 602. Memory 604 may comprise a non-transitory memory system including a dynamic random-access memory (DRAM), static random-access memory (SRAM), Flash (e.g., NAND Flash), or combinations thereof. In one embodiment, bus 614 may comprise a Peripheral Component Interconnect Express (PCIe) bus. In some embodiments, bus 614 may comprise multiple busses instead of a single bus.

Memory 604 illustrates an example of non-transitory computer storage media for the storage of information such as computer-readable instructions, data structures, program modules, or other data. Memory 604 can store a basic input/output system (BIOS) in read-only memory (ROM), such as ROM 608, for controlling the low-level operation of the device. The memory can also store an operating system in random-access memory (RAM) for controlling the operation of the device Applications 610 may include computer-readable and computer-executable instructions which, when executed by the device, perform any of the methods (or portions of the methods) described previously in the description of the preceding Figures. In some embodiments, the software or programs implementing the method embodiments can be read from a hard disk drive (not illustrated) and temporarily stored in RAM 606 by CPU 602. CPU 602 may then read the software or data from RAM 606, process them, and store them in RAM 606 again.

The computing device 600 may optionally communicate with a base station (not shown) or directly with another computing device. One or more network interfaces in peripheral devices 612 are sometimes referred to as a transceiver, transceiving device, or network interface card (NIC).

An audio interface in peripheral devices 612 produces and receives audio signals such as the sound of a human voice. For example, an audio interface may be coupled to a speaker and microphone (not shown) to enable telecommunication with others or generate an audio acknowledgment for some action. Displays in peripheral devices 612 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 612 may comprise any input device arranged to receive input from a user. An illuminator in peripheral devices 612 may provide a status indication or provide light. The device can also comprise an input/output interface in peripheral devices 612 for communication with external devices, using communication technologies, such as USB, infrared, Bluetooth™, or the like. A haptic interface in peripheral devices 612 provides tactile feedback to a user of the client device.

A GPS receiver in peripheral devices 612 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 6, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, the claimed or covered subject matter is intended to be broadly interpreted. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "or," "and," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur in any order other than those noted in the illustrations. For example, two blocks shown in succession can, in fact, be executed substantially concurrently, or the blocks can sometimes be executed in the reverse order, depending upon the functionality or acts involved.

These computer program instructions can be provided to a processor of a general-purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure, a computer-readable medium (or computer-readable storage medium) stores computer data, which data can include computer program code or instructions that are executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage, or other magnetic storage devices, or any other physical or material medium which can be used to tangibly store the desired information or data or instructions and which can be accessed by a computer or processor.

For the purposes of this disclosure, a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than or more than all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A method comprising:

detecting, by a processor, an interstitial break during playback of a primary media asset;

identifying, by the processor, an interstitial associated with the interstitial break, the interstitial associated with a type comprising a data format of the interstitial;

analyzing, by the processor, the data format of the interstitial to determine which of a plurality of available renderers is compatible with the data format, the plurality of available renderers comprising a set of rendering components managed by an interstitial plugin, each rendering component of the set configured to process a different interstitial data format;

selecting, by the processor, a renderer from the plurality of available renderers based on the type of the interstitial during the interstitial break;

instantiating, by the processor, the renderer as a separate rendering component; and executing, by the processor, the interstitial using the renderer.

2. The method of claim 1, further comprising parsing a manifest associated with the primary media asset to identify the interstitial break.

3. The method of claim 2, wherein parsing a manifest to identify the interstitial break comprises parsing an M3U8 manifest to identify an EXT-X-DATERANGE element, the EXT-X-DATERANGE element having a CLASS attribute set to a preconfigured value.

4. The method of claim 1, further comprising resolving the interstitial break by:

receiving, by the processor, a uniform resource locator (URL) associated with the interstitial;

transmitting, by the processor, a network request using the URL and receiving an interstitial payload in response; and storing, by the processor, the interstitial payload in a cache.

5. The method of claim 4, further comprising augmenting the URL with at least one parameter, the at least one parameter representing a property a device executing the renderer.

6. The method of claim 5, wherein executing the interstitial further comprises performing one or more actions consisting of: handling interactions with the interstitial; or tracking events occurring while playing the interstitial.

7. The method of claim 1, wherein the primary media asset comprises an Hypertext Transfer Protocol Live Streaming (HLS) asset and the type of the interstitial comprises one of a Video Ad Serving Template (VAST), Video Player-Ad Interface Definition (VPAID), JavaScript Object Notation (JSON), or extensible Markup Language (XML) interstitial.

8. A non-transitory computer-readable storage medium for tangibly storing computer program instructions capable of being executed by a computer processor, the computer program instructions defining steps of:

detecting an interstitial break during playback of a primary media asset;

identifying an interstitial associated with the interstitial break, the interstitial associated with a type comprising a data format of the interstitial;

analyzing, by the processor, the data format of the interstitial to determine which of a plurality of the multiple available renderers is compatible with the data format, the plurality of available renderers comprising a set of rendering components managed by an interstitial plugin, each rendering component of the set configured to process a different interstitial data format;

selecting a renderer from the plurality of multiple available renderers based on the type of the interstitial during the interstitial break;, each renderer configured to process the data format and playback media content in its corresponding interstitial type, wherein each of the multiple available renderers is configured to process a different interstitial data format;

instantiating the rendereras a separate rendering component; and executing the interstitial using the renderer.

9. The non-transitory computer-readable storage medium of claim 8, the steps further comprising parsing a manifest associated with the primary media asset to identify the interstitial break.

10. The non-transitory computer-readable storage medium of claim 9, wherein parsing a manifest to identify the interstitial break comprises parsing an M3U8 manifest to identify an EXT-X-DATERANGE element, the EXT-X-DATERANGE element having a CLASS attribute set to a preconfigured value.

11. The non-transitory computer-readable storage medium of claim 8, the steps further comprising resolving the interstitial break by:

receiving a uniform resource locator (URL) associated with the interstitial;

transmitting a network request using the URL and receiving an interstitial payload in response; and storing the interstitial payload in a cache.

12. The non-transitory computer-readable storage medium of claim 11, the steps further comprising augmenting the URL with at least one parameter, the at least one parameter representing a property a device executing the renderer.

13. The non-transitory computer-readable storage medium of claim 12, wherein executing the interstitial further comprises performing one or more actions consisting of: handling interactions with the interstitial; or tracking events occurring while playing the interstitial.

14. The non-transitory computer-readable storage medium of claim 8, wherein the primary media asset comprises a Hypertext Transfer Protocol Live Streaming (HLS) asset and the type of the interstitial comprises one of a Video Ad Serving Template (VAST), Video Player-Ad Interface Definition (VPAID), JavaScript Object Notation (JSON), or extensible Markup Language (XML) interstitial.

15. A device comprising:

a processor; and a storage medium for tangibly storing thereon logic for execution by the processor, the logic comprising instructions for:

detecting an interstitial break during playback of a primary media asset;

identifying an interstitial associated with the interstitial break, the interstitial associated with a type comprising a data format of the interstitial;

analyzing, by the processor, the data format of the interstitial to determine which of a plurality of available renderers is compatible with the data format, the plurality of available renderers comprising a set of rendering components managed by an interstitial plugin, each rendering component of the set configured to process a different interstitial data format;

selecting a renderer from the plurality of available renderers based on the type of the interstitial during the interstitial break;

instantiating the rendereras a separate rendering component; and executing the interstitial using the renderer.

16. The device of claim 15, the instructions further comprising parsing a manifest associated with the primary media asset to identify the interstitial break.

17. The device of claim 16, wherein parsing a manifest to identify the interstitial break comprises parsing an M3U8 manifest to identify an EXT-X-DATERANGE element, the EXT-X-DATERANGE element having a CLASS attribute set to a preconfigured value.

18. The device of claim 15, the instructions further comprising resolving the interstitial break by:

receiving a uniform resource locator (URL) associated with the interstitial;

transmitting a network request using the URL and receiving an interstitial payload in response; and storing the interstitial payload in a cache.

19. The device of claim 18, the instructions further comprising augmenting the URL with at least one parameter, the at least one parameter representing a property a device executing the renderer.

20. The device of claim 19, wherein executing the interstitial further comprises performing one or more actions consisting of: handling interactions with the interstitial; or tracking events occurring while playing the interstitial.

* * * * *